INVENTOR
TRUMAN M. CURRY

AFT ← → FOREWARD

INVENTOR.
TRUMAN M. CURRY
BY Christensen, Sanborn & Matthews
ATTORNEYS

FOREWARD ← → AFT

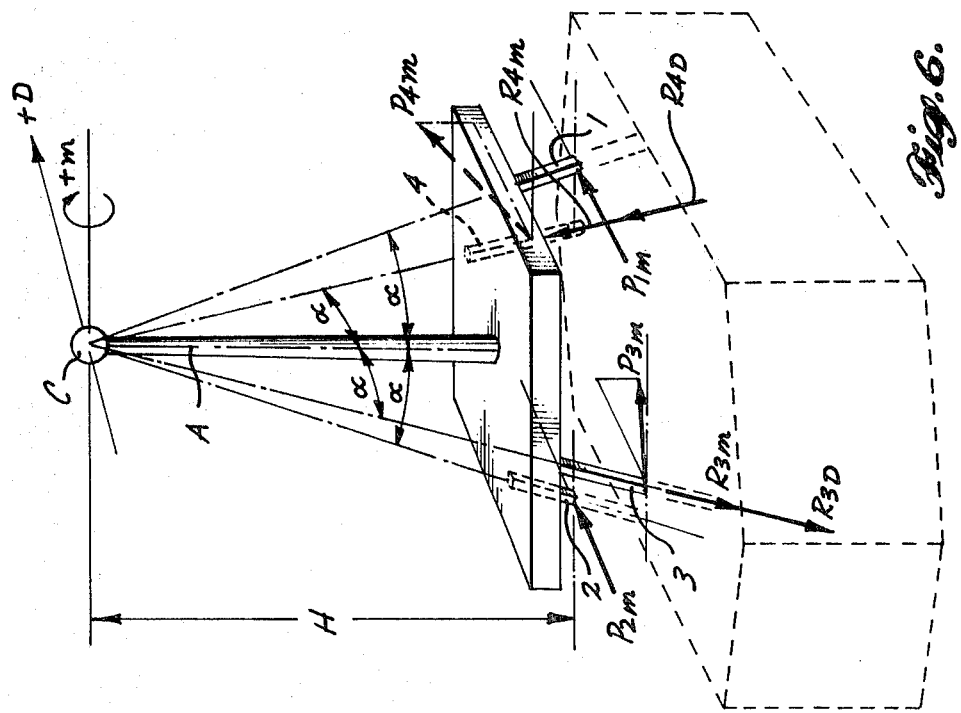
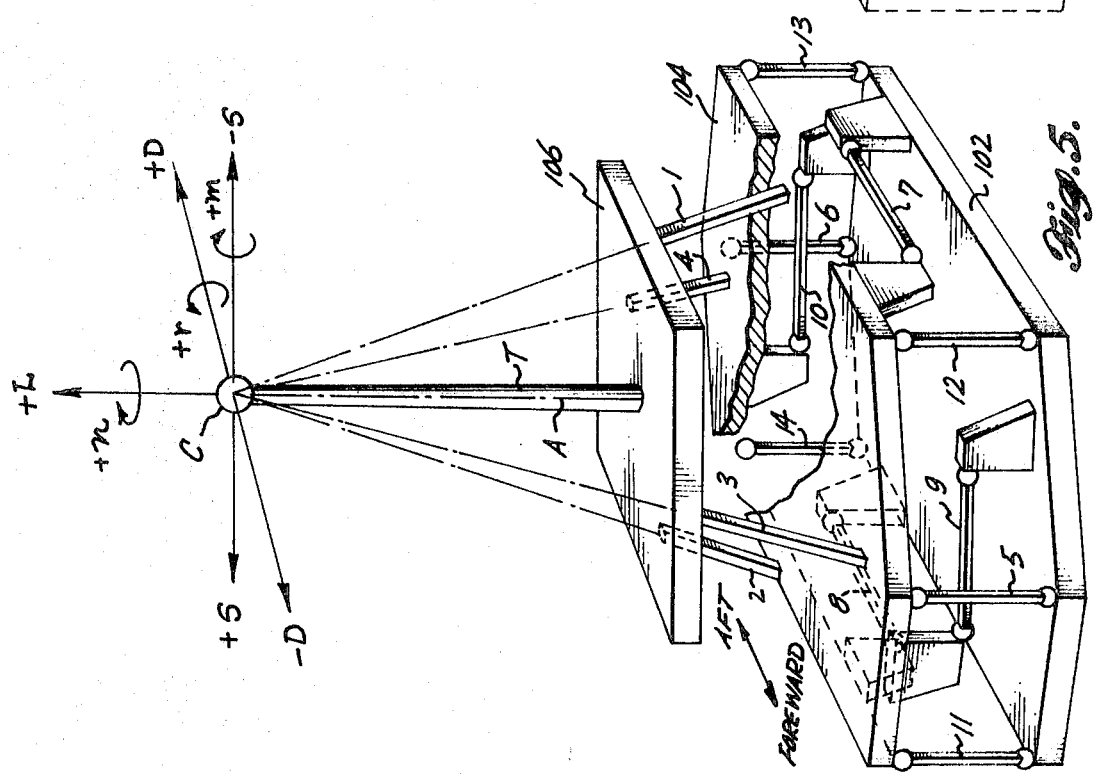

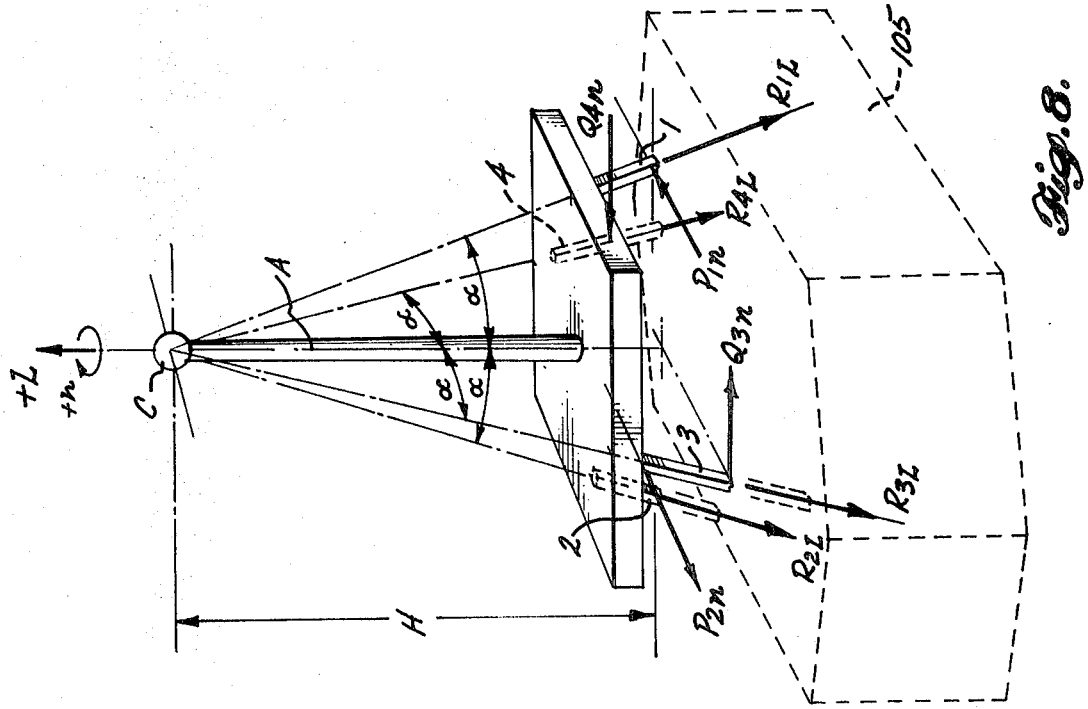
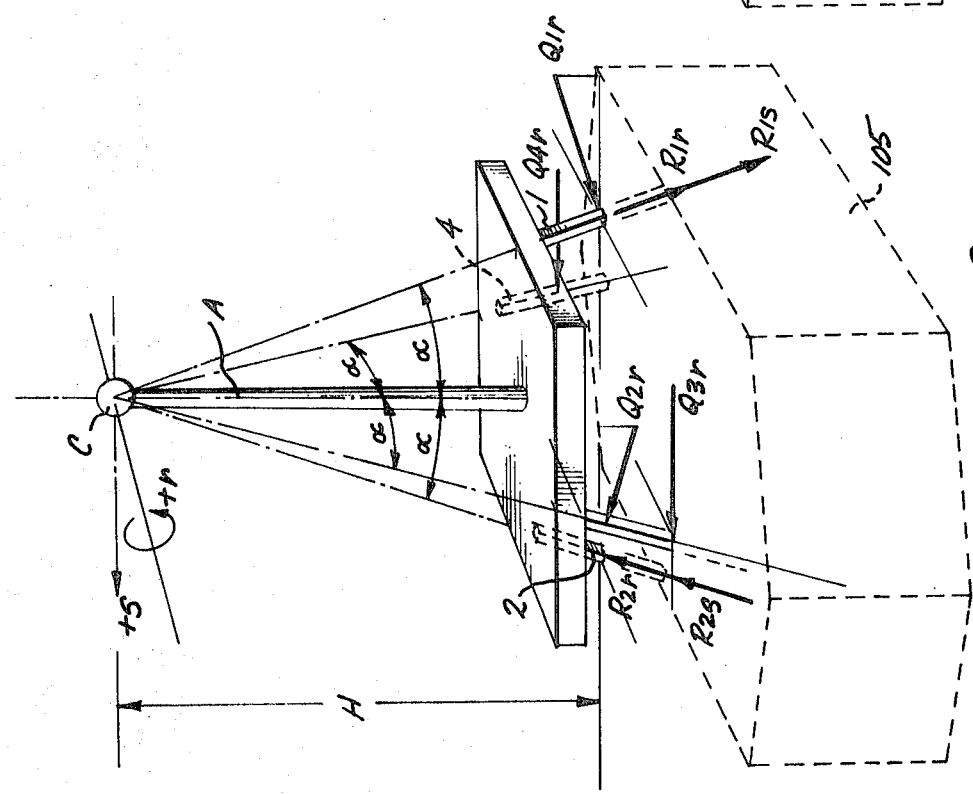

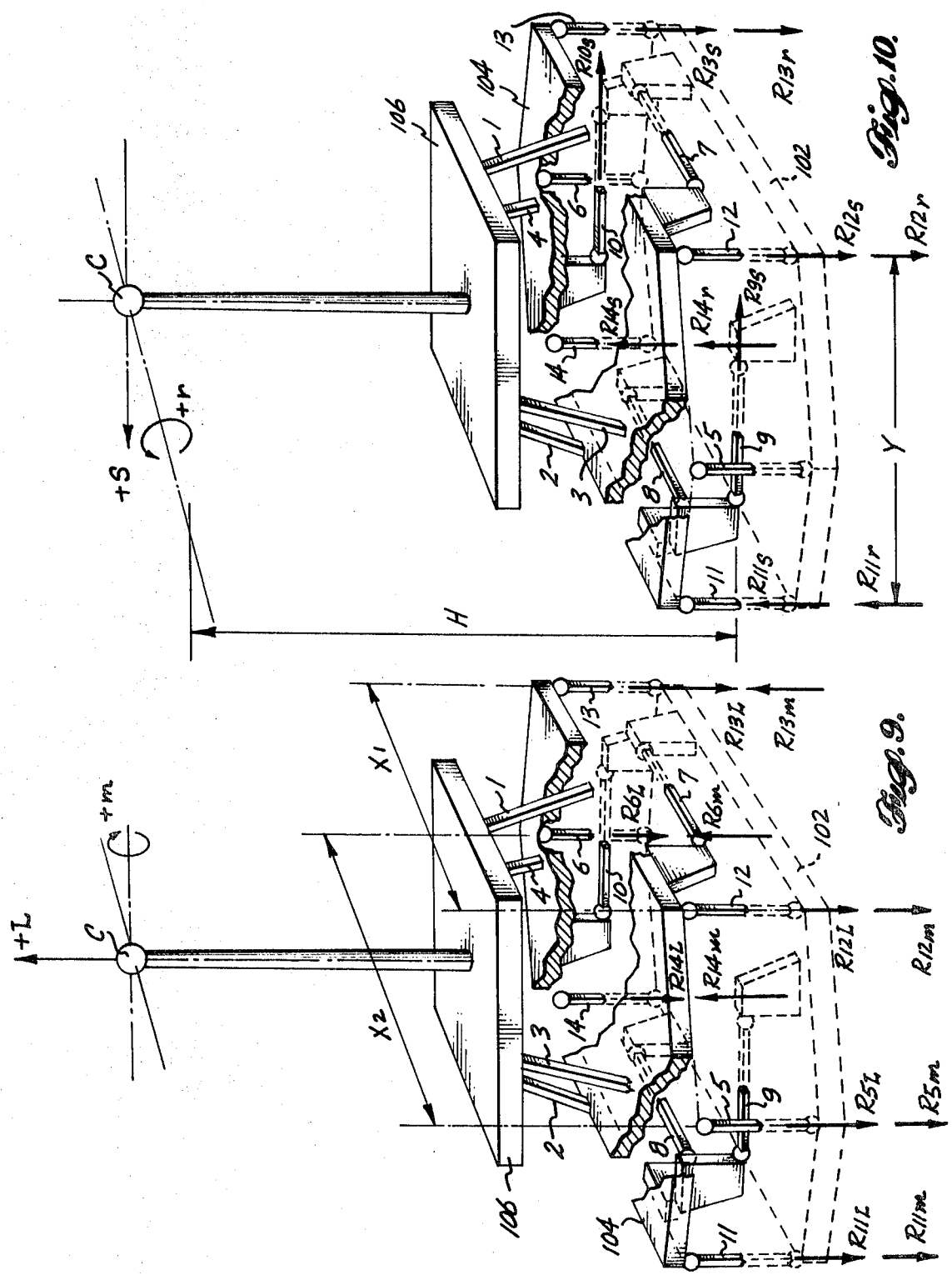

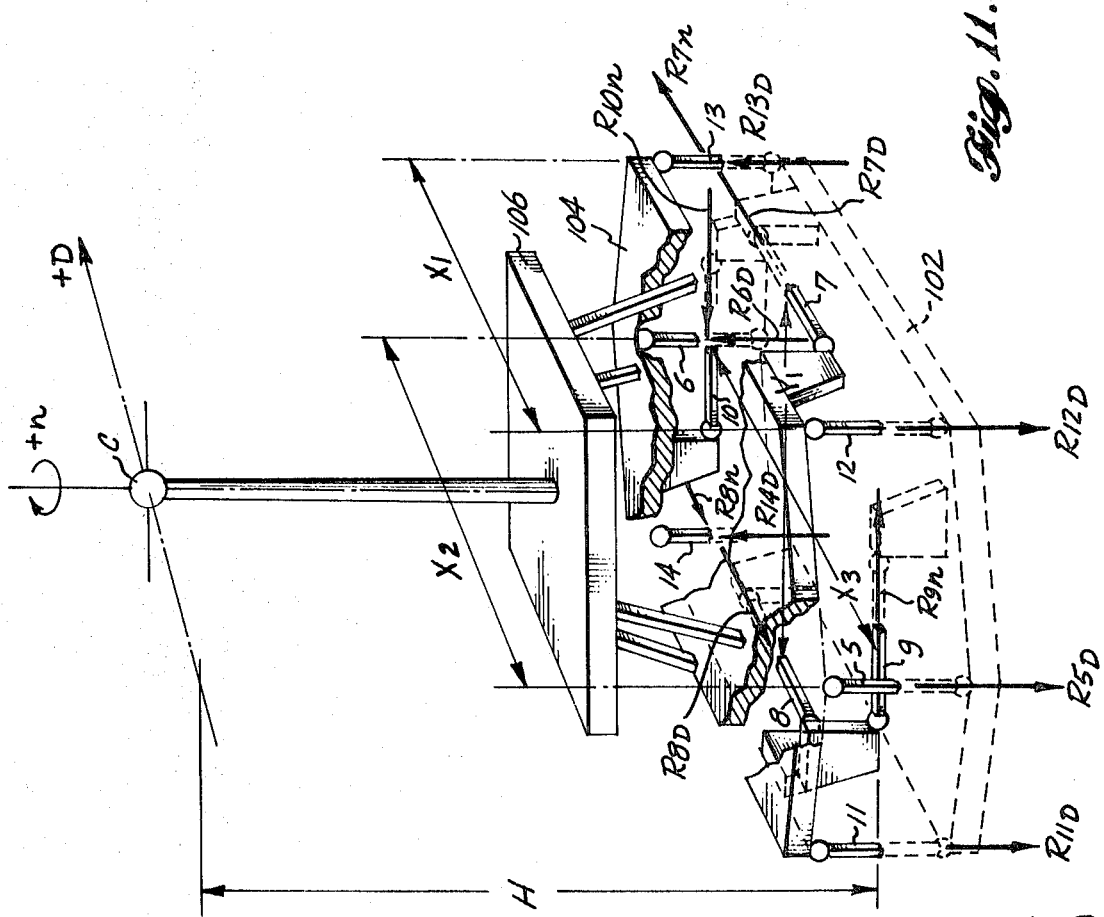

Oct. 19, 1971                    T. M. CURRY                    3,613,443
                    LARGE SCALE EXTERNAL BALANCE FOR WINDTUNNELS
Filed Dec. 22, 1969                                       15 Sheets-Sheet 9

INVENTOR
TRUMAN M. CURRY
BY Christensen, Sanborn & Matthews
ATTORNEYS

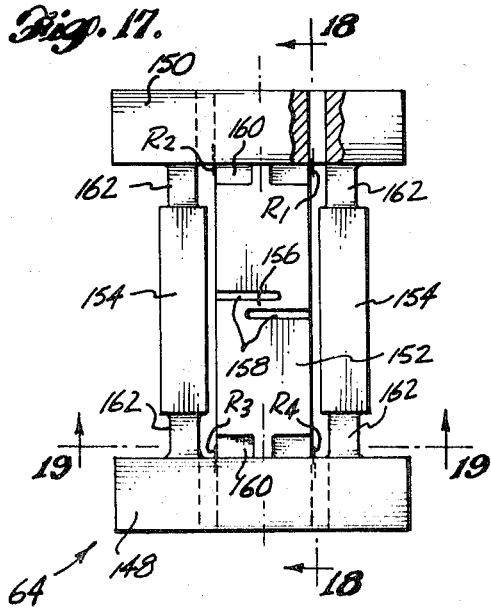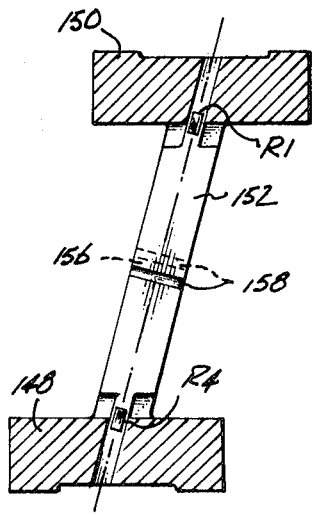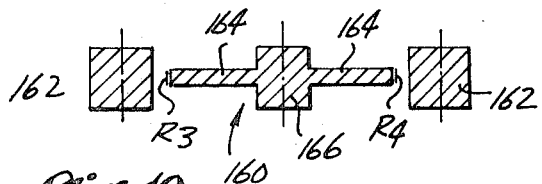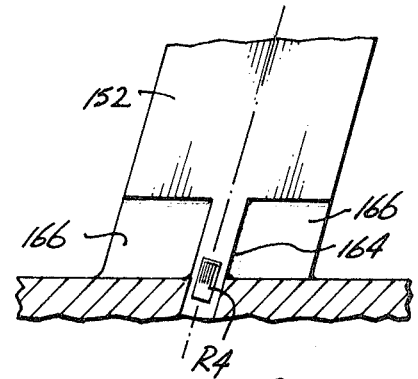
INVENTOR.
TRUMAN M. CURRY
BY Christensen, Sanborn & Matthews
ATTORNEYS Oct. 19, 1971  T. M. CURRY  3,613,443
LARGE SCALE EXTERNAL BALANCE FOR WINDTUNNELS
Filed Dec. 22, 1969  15 Sheets-Sheet 11
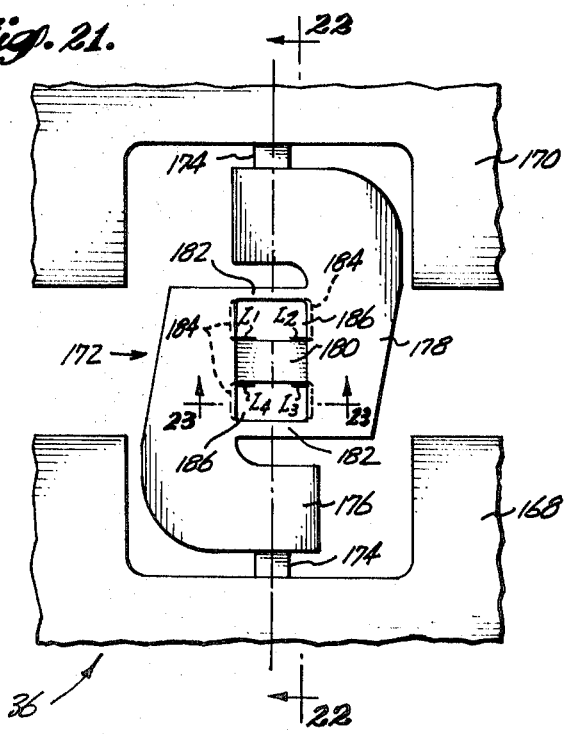
Fig. 21.
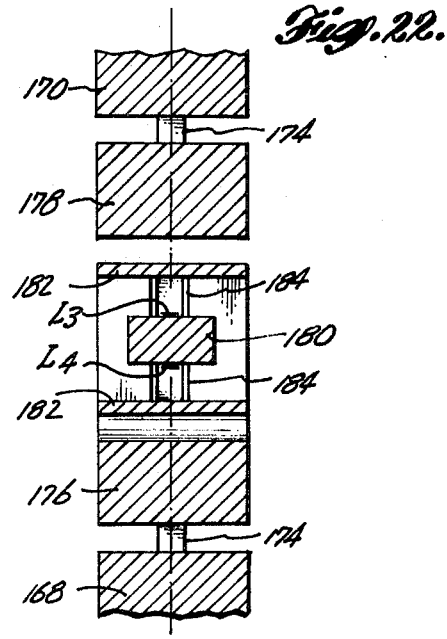
Fig. 22.
Fig. 23.
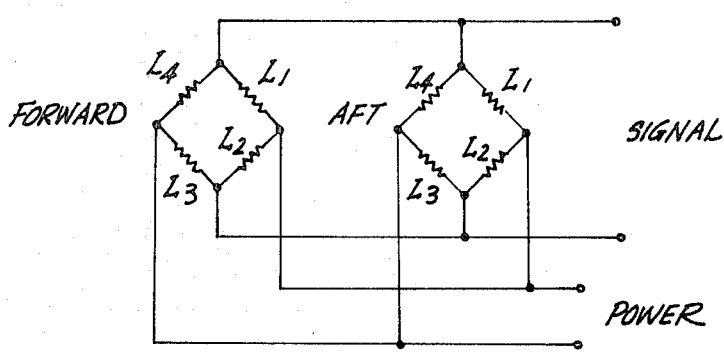
Fig. 23a.
INVENTOR
TRUMAN M. CURRY
BY Christensen, Sanborn
& Matthews
ATTORNEYS

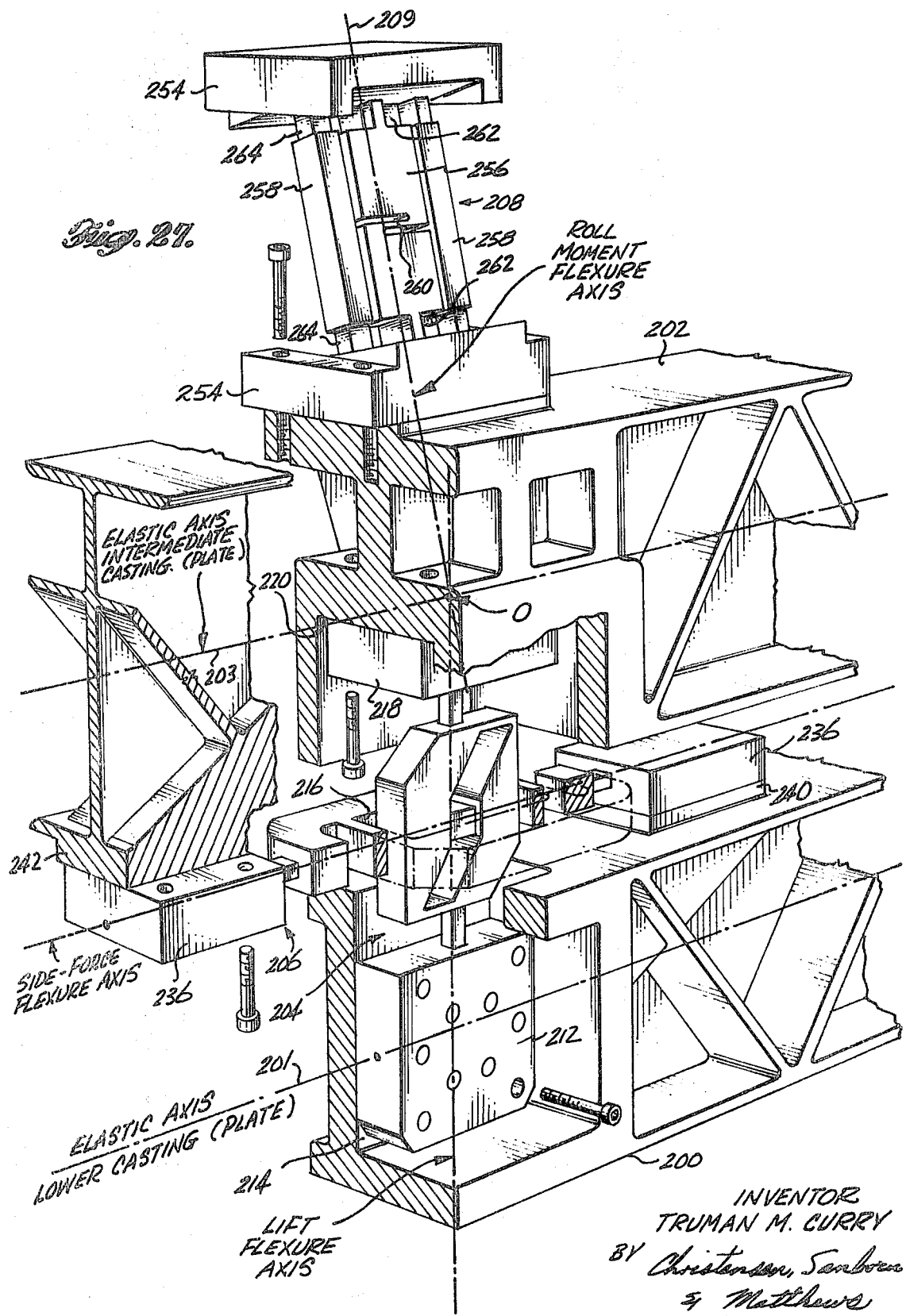

United States Patent Office 3,613,443
Patented Oct. 19, 1971

3,613,443
LARGE SCALE EXTERNAL BALANCE
FOR WIND TUNNELS
Truman M. Curry, Mercer Island, Wash., assignor to
The Boeing Company, Seattle, Wash.
Filed Dec. 22, 1969, Ser. No. 886,914
Int. Cl. G01m 9/00
U.S. Cl. 73—147
27 Claims

ABSTRACT OF THE DISCLOSURE

A large scale external balance for wind tunnel applications which can measure the six basic components of force and moment acting on a test model from a location outside the wind tunnel is adapted to cover a broad range of test requirements with compact, lightweight rigid design. The disclosed balance consists of three annular plate structures assembled in spaced relationship separated and supported by flexure members having the same temperature coefficient of expansion as the plate structures and permitting simultaneous measurement of strains proportional to the six components of loading. The strains are localized to minimize deflections and are measured as reactions internal to the structure by strain gauges wire in bridge circuits to measure the forces and moments about a reference center external to the physical body of the balance itself. A space in the center of the annular balance permits ducting of auxiliary air through the balance and test model supporting strut to the model itself for special test uses without interference with the functions of the balance. Various details of flexure configurations and cooperative arrangements thereof are disclosed.

BACKGROUND AND SUMMARY OF THE INVENTION

This invention relates to force-measuring instruments of the type wherein strain gauges are utilized for electrical measurement of stresses imposed by test conditions in wind tunnel and other test applications. More specifically, it relates to a large scale strain gauge balance adapted to measure the six standard components of force and moment directly from a location remote from the test model itself, preferably offset transversely of the test model and wind tunnel airflow axis. The invention resides in various features of arrangement and structure of force and moment measuring flexures interconnecting structural components for support of the model on a strut through which the forces and moments are transmitted to the balance, including an internal passageway through which air-ducting to the model is permitted without interference with the functions of the balance.

Strut-mounted models and half-models are often tested on external balances in wind tunnels. Some wind tunnels have external balances built as permanent structures in the proximity of the test section, usually beneath it. Such balances are frequently expensive and are designed on a compromise basis as multi-purpose devices geared to average test requirements for use in a broad range of model testing. Being generally large and massive, these balances suffer from low natural frequencies resulting in low response rates. Many such balances have not utilized strain gauges as measuring elements in the past.

Another type of balance well-known for wind tunnel testing purposes is the internal sting type balance which is mounted internally of the model itself on a strut projecting longitudinally of the tunnel. This type is more compact and often suffers from the effects of comparatively high flexibility, causing relatively low frequency response, higher attitude and weight tare corrections, relatively higher interaction errors. Interaction errors are those caused by misalignments or deflections of the measuring elements which cause them to be sensitive to load components other than those which they were designed to measure.

While such internal balances may be tailored to measure specific loads encountered during given tests of a model and may, therefore, measure such loads very accurately, the loads acting on the model may not prove to be representative of the loads on the prototype aircraft or other device being tested because of distortions of the model itself to incorporate space for the internal balance or the support for it, or for ducting of internal airflow. In addition, corrections for distortion of the model or the airflow around it at the point where the sting type balance enters the model are difficult to compute, since the pressure distribution over the distorted area, had it not been distorted, is usually not known.

On the other hand, the large scale external balance has the advantage of being so located that occupancy space requirements are not critical. The designer is provided with greater freedom, and deflections and temperature corrections attributable to the strut connections are minimized; hence measurement accuracies are increased. Thus, a given external balance may be made to cover a much wider range of load for a specified percentage-wise force measurement accuracy, and although the cost per balance is relatively high, one external balance may be made to cover a broader range of test requirements (more models tested per balance).

Another advantage of external balances is that wind tunnel models for testing thereon are generally cheaper to construct than those adapted for testing on internal balances. Space otherwise taken up by an internal balance may be used for structural purposes or for locating auxiliary equipment sch as pressure measuring transducers, drive motors or internal ducting for auxiliary air, for example. Auxiliary air supplied to the model, usually under high pressure and supplied via the balance and support strut, exerts undesirable forces (tares) on the balance, and these forces are functions of temperatures, temperature gradients, and internal pressures.

In accordance with this invention, these tares are minimized by keeping the stiffness ratio of the balance structure to the air ducting structure as high as possible. As will be seen, balances constructed in accordance with the invention are of extremely rigid configuration, and a large central cavity is provided in which a limber ducting system may be utilized for passing large volumes of auxiliary air to a model supported on the strut attached to the balance.

In addition, the mechanical and electrical moment measuring reference center of the balance is made approximately coincident with the model center of pressure. This produces relatively low moment tares, which, coupled with the ruggedness of the balance, makes it ideal for half-model testing where unbalanced moments are extremely high and are typically beyond the capability of miniaturized sting-type balance devices. The purpose of half-model testing is to provide for models of maximum size for a given size of wind tunnel. Often auxiliary air is supplied to half-models for blown flaps, simulated jet engine flow and other test purposes.

This invention seeks to provide solutions to the above-mentioned problems and to take best advantage of the external type balance approach. The invention provides a device for measuring loads acting on a model mounted thereon at a reference center remote from the device. It includes a plurality of load-measuring members, transversely spaced substantially symmetrically with respect to a central axis passing through the reference center. The load measuring members include moment measure members and force measuring members which interconnect rigid supporting structures lying generally in planes transverse to the central axis. In one form of the device, one such supporting structure forms a base and is connected to an intermediate structure by the force measuring members, while the moment measuring members connect the intermediate structure to means for supporting the model to be tested.

Preferably a pair of moment measuring members are mounted in a first axial plane on convergent member axes which intersect the reference center. A second pair of moment measuring members are preferably positioned in a second axial plane perpendicular to the first. Each such member preferably includes a measuring beam, which is insensitive to forces acting along its axis, but is sensitive to translational forces transverse to the axial plane, and stabilizing means mounted in parallel with the measuring beam to carry axial loads thereon. The stabilizing means is limber to the translational forces. The measuring beam includes an axial force relief flexure and end sections where strain gauges are mounted to measure the translational forces caused by moments acting about the reference center.

Because of convergence of the moment member axes at the reference center, these members can be made insensitive to axial forces therein caused by translational forces acting at the reference center and perpendicular to either of the first and second planes.

The force measuring members include a pair of longitudinally oriented members for measuring forces acting in the direction of the central axis. In addition, these preferably include pairs of force measuring members having axes lying in a transverse plane transverse to the central axis, the members of each pair being advantageously spaced equidistant from the axis and adapted to measure translational forces between the base and intermediate structures of the device. The force measuring section also preferably includes stabilizing members (corner flexures) spaced maximum distances in symmetry laterally of the central axis and adapted to absorb bending moments between the base and intermediate plate structures, also referred to as "overturning" moments.

The invention further encompasses particular constructions of the force measuring flexures. Each preferably includes end sections having moment relief flexures which are stiff to axial forces thereon and a center section comprising body portions supported by the respective end sections and interconnected by a stiff central transverse measuring beam sensitive to axial forces and first and second axially limber stabilizing beams on opposite sides of the measuring beam axially of the member. These are adapted to permit translational forces to be absorbed by the measuring beam while preventing bending moments therein.

The invention further resides in spaced arrangement of the components of the device to provide an inner space for supply of auxiliary air to a test model. Means are provided for connecting such auxiliary air supply to the model mounting structure while also incorporating a turntable arrangement for rotating the model about the central axis. The turntable is mounted and operated in such a way that forces resulting from movement thereof are internal to the balance and are not sensed by the load measuring members.

One embodiment of the invention is especially adapted for extra large scale applications in which weight becomes a major factor. The axes of the force and moment measuring members are aligned with the elastic axes of the side beams of the supporting structures so that torsional stresses are not placed on the beams tending to distort them. This feature permits lighter weight construction. Included in this development is a special combination of load measuring members in which one is positioned within the other.

These and other features, objects and advantages of the invention will be more fully understood from the following detailed description thereof with reference to the accompanying drawings and diagrams illustrating the principles of the invention and its preferred forms.

BRIEF DESCRIPTION OF THE DRAWINGS

FIG. 5 is a mechanical schematic diagram showing the general arrangement of load measuring members in the balance and the loads applied.

FIGS. 6 to 11 are free-body diagrams illustrating in each case the reactions due to forces and moments applied at the reference center at which the test model is mounted.

FIG. 17 is a front elevation of a roll moment measuring member and FIGS. 18 and 19 are sectional views thereof taken on lines 18—18 and 19—19, respectively.

FIG. 20 is an enlarged view of a portion of FIG. 18.

FIG. 21 is a front elevation of a lift force measuring member and FIGS. 22 and 23 are sectional views thereof taken on lines 22—22 and 23—23 respectively. FIG. 23a is a circuit diagram of typical strain gauge bridge circuit wiring.

FIG. 27 is a partial isometric view of a second embodiment of the large scale external balance in accordance with the invention, with portions cut away and shown in section to reveal internal details and with auxiliary dot-dash lines to illustrate alignment of portions of the structure.

DESCRIPTION OF THE PREFERRED EMBODIMENTS

Figure 1:
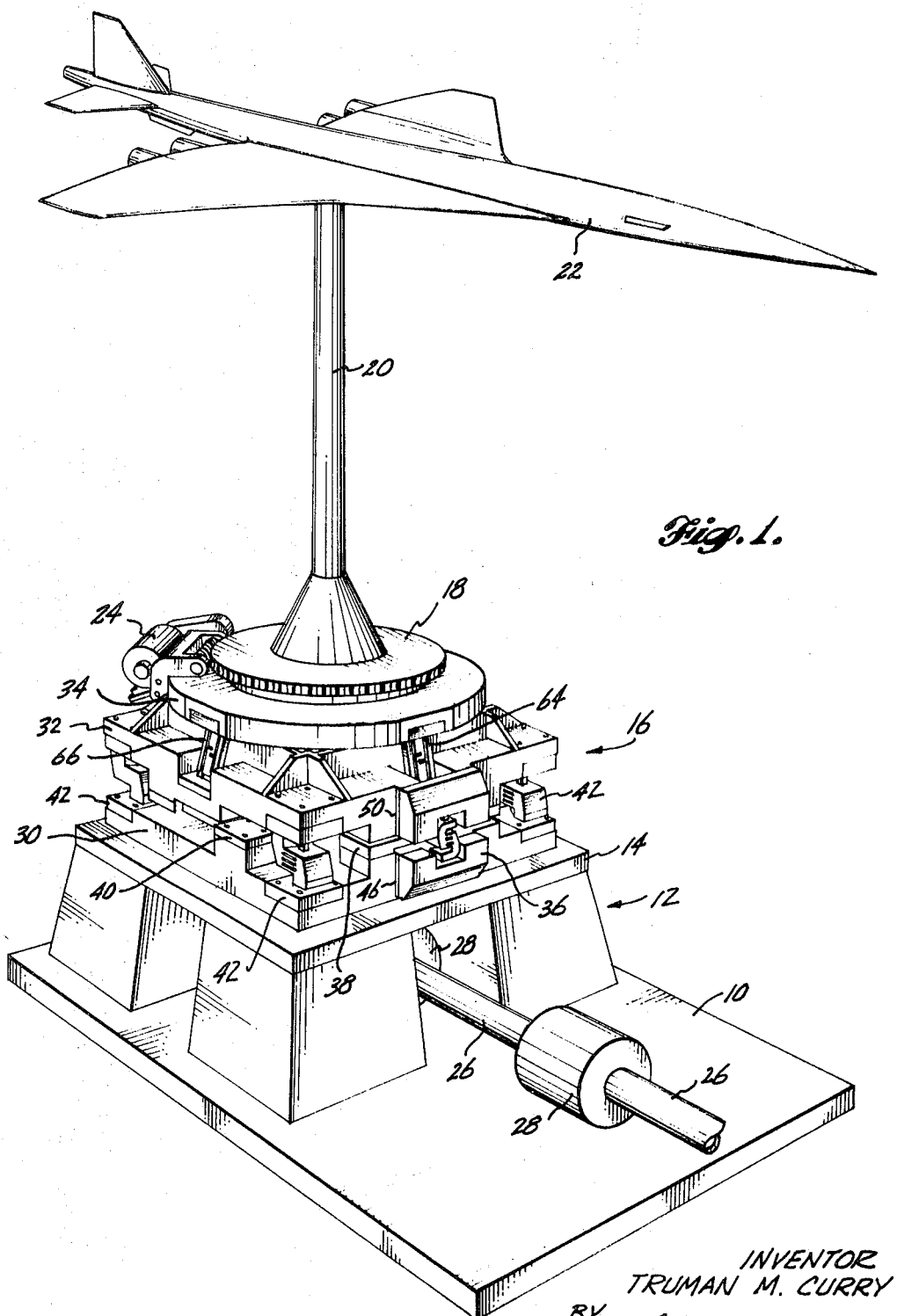
FIG. 1 is an isometric view of a large scale external balance according to the invention, showing the balance in its assembled form mounted on a supporting structure and having a simulated aircraft model mounted above it on a supporting strut secured to the top of the balance.

A large scale external balance of the type illustrated to disclose the present invention is typically (though not necessarily) mounted below the test section of a wind tunnel and supports the test model on a strut projecting through the wind tunnel floor to hold the model substantially at the central axis of the tunnel. FIG. 1, which is a drawing made from a wooden model of the device, depicts the general mounting arrangement, without showing the wind tunnel itself. The plate 10 represents the ground support upon which is constructed a rigid, four-legged support 12 having a top plate 14 to which the balance 16 itself is firmly secured. An annular turntable 18 mounted atop the balance 16 carries a model supporting strut 20, on the top of which a test model 22 is secured in a position substantially centrally of the wind tunnel test section (not shown). A wind shield is usually constructed within the tunnel and around the strut (and separated therefrom) to protect it from wind loads which would otherwise affect measurements.

The model-holding structure may be of any suitable configuration, depending upon the model and the type of test being conducted. For instance in a side-mounted arrangement a spacer block may be used for supporting a half-model very close to the wind tunnel wall, or in a floor-mounted arrangement a pitching strut or "rocking horse" support system may be used to permit positional adjustment of the model in the pitching plane. In the floor-mounted arrangement a powered pitch angle drive mechanism (not shown) mounted on the turntable may be provided to permit angle of attack adjustments. The motor 24 is provided to adjust the turntable position in the yaw direction through a worm gear arrangement.

The balance is constructed with a central cavity through which auxiliary air may be supplied to the model by suitable auxiliary piping 26 interconnected by flexible fittings 28 and passing through the supporting mount 12, the balance 16, the annular turntable 18, and the strut 20 to the model 22. The ducting is made extremely flexible relative to the rigid balance itself to minimize interaction errors attributable to the high pressure air supply system. The arrangement of the flexures and interconnecting support members of the balance according to the invention is designed to permit maximum space in the central cavity for such auxiliary air ducts.

Figure 2:
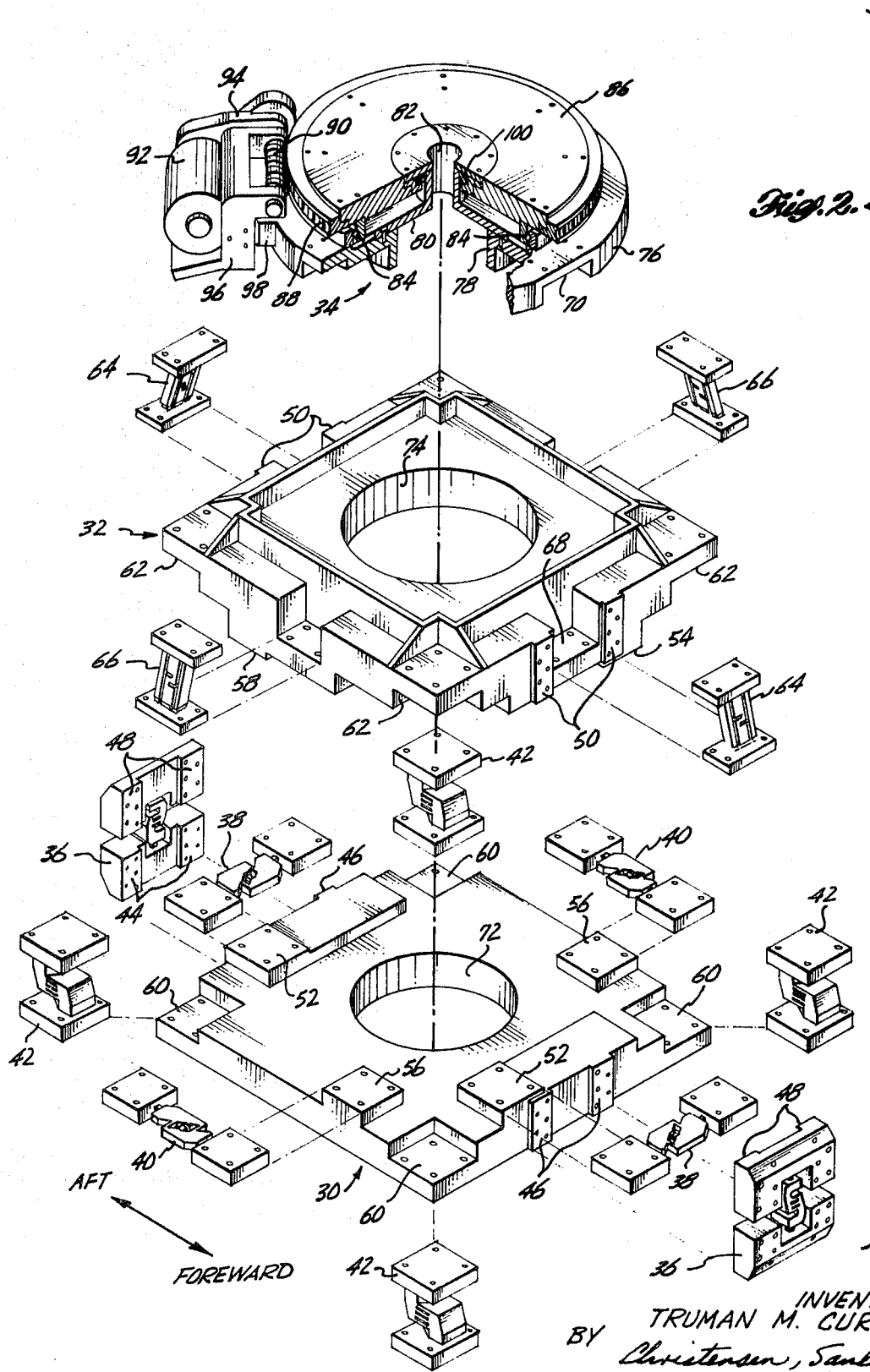
FIG. 2 is an exploded isometric view of the balance shown assembled in FIG. 1, with portions of subassemblies shown partially cut away and sectioned to illustrate internal details.

The preferred large scale external balance, shown assembled in FIG. 1 and in an exploded view in FIG. 2, consists generally of three plate-like support structures 30, 32 and 34 interconnected by force and moment measuring flexure members. The force measuring flexure members interconnect the lower two plates 30 and 32, while the moment measuring flexure members interconnect the upper two plates 32 and 34.

Specifically, the force measuring members include lift force members 36, side force members 38, and drag force members 40. Also interconnecting the lower plate structures are four corner flexure members 42 which serve to absorb bending moments while being limber to translational forces (except lift) as will be seen.

The lift force members are assembled with the lower plate 30 by bolting their lower mounting faces 44 to the mounting surfaces 46 on the fore and aft sides of the plate structure 30 and are assembled with the intermediate plate 32 by bolting their upper mounting faces 48 to the mounting surfaces 50 on the fore and aft sides of the intermediate plate 32.

Side force members 38 are assembled to the lower plate structure 30 by bolting their left-hand ends to the mounting surfaces 52 on the top of the plate 30, and are assembled with the intermediate plate 32 by bolting the right-hand ends thereof to the mounting surfaces 54 of intermediate plate 32. The dimensions are such that the left-hand ends of side force members 38 are separated from the intermediate plate 32, while the right-hand ends thereof are separated from the lower plate 30.

Drag force members 40 are assembled with the lower plate structure 30 by having their forward ends bolted to mounting surfaces 56 on the top of plate structure 30, and are assembled with intermediate plate 32 by having their aft ends bolted to the lower mounting surfaces 58 on the lower surface of plate structure 32. In this case the clearances are such that the forward ends of the drag force members are separated from intermediate plate 32, while the aft ends thereof are separated from lower plate 30.

The lower mounting blocks of corner flexures 42 are assembled with the lower plate structure 30 by being seated and bolted in place in corner cutouts 60. The upper mounting blocks thereof are assembled with intermediate plate 32 by being seated and bolted in place in corner cutouts 62 in the plate structure 32.

Intermediate plate 32 and upper plate structure 34 are interconnected by moment measuring flexure members. These combine fore and aft roll moment members 64 and right and left pitch moment members 66 aligned in the pitch and roll moment planes respectively. The roll moment members are positioned just inside the lift members 36. They are assembled with intermediate plate 32 by bolting their lower ends in seats 68 in the fore and aft sides of the plate structure and to the upper plate structure 34 by bolting their upper ends into seats 70.

Lower and intermediate plate structures 30 and 32 are of extremely rigid construction and have central passageways 72 and 74 therein, respectively, to receive the previously mentioned high-pressure air ducting for auxiliary air supply to the test model. The upper plate assembly 34 includes a rigid, generally circular plate 76 which also has a center passageway 78 to receive the air ducting. Secured to plate 76 around its center opening 78 is a sealing plate 80, which has an upwardly extending cylindrical tube portion 82 at the center. The auxiliary air supply tubing (FIG. 1) is attached by means of a flexible bellows or other suitable device to minimize transmission of forces to the balance. Suitable tubing in the strut 20 or other mounting apparatus is secured over the opening of tube portion 82 to receive the auxiliary air therefrom. The air supply ducting secured to the sealing plate 80 hangs from it and does not contact the remainder of the balance, but passes downwardly through a flexible elbow arrangement (not shown) to horizontal tubing 26 (FIG. 1).

Also mounted on rigid upper plate 76 by means of an annular bearing race 84 is an annular turntable 86 supported by the inner ring of bearing race 84 and having a driven worm gear 88 around its outer periphery. The turntable is rotated by the worm gear drive 90 turned by the electric motor 92 through the drive assembly 94. The motor, drive assembly and worm gear drive are supported by a bracket 96 mounted on a projection 98 on the upper balance plate 76.

Figure 3:
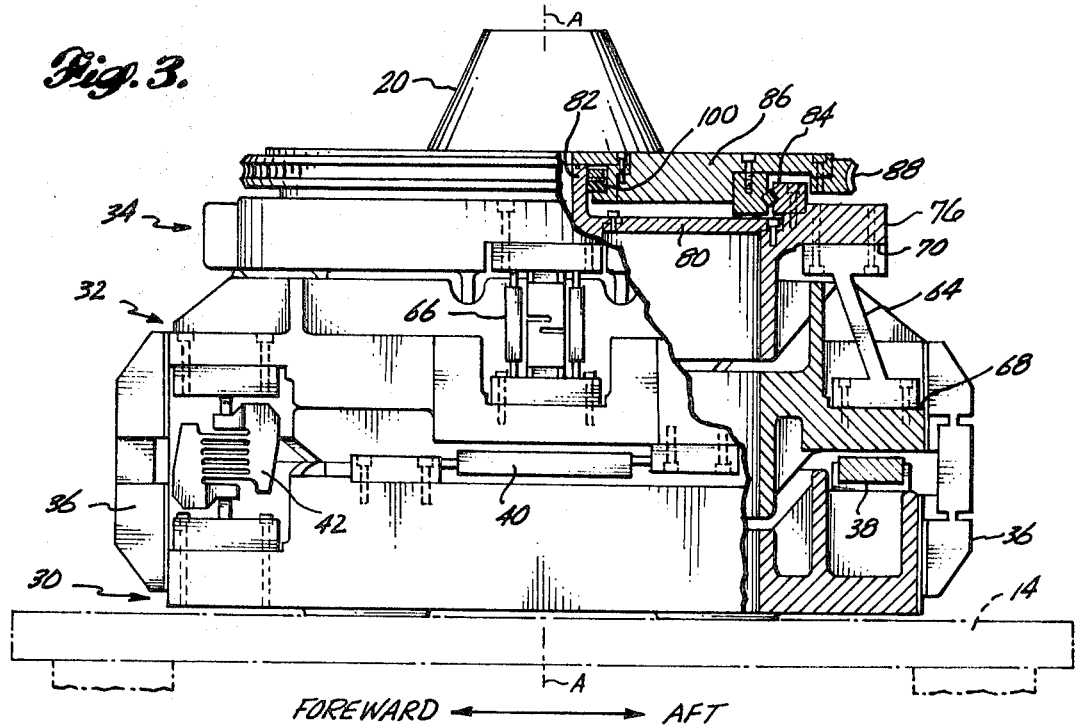
FIGS. 3 and 4 are side and rear elevations of a large scale external balance similar to that shown in FIGS. 1 and 2, with portions of FIG. 3 cut away and shown in section.

The details of the turntable and associated mountings are illustrated in cross section in FIG. 3, showing the tubular projection 82 of the sealing plate 80 engaging a seal member 100 in sliding airtight contact around the opening through the turntable 86. Any suitable airtight seal arrangement permitting rotation without air leakage is utilized to permit transmittal of auxiliary air to the strut structure 20. O-ring or labyrinth friction seals, for example, are employed between the rotatable turntable 86 and the fixed sealing plate 80 to minimize frictional loads within the seal. However, such loads, as well as driving loads from the worm gear drive system, are internal to the upper plate assembly. Hence they are not felt by the external load sensing measuring elements.

Figure 4:
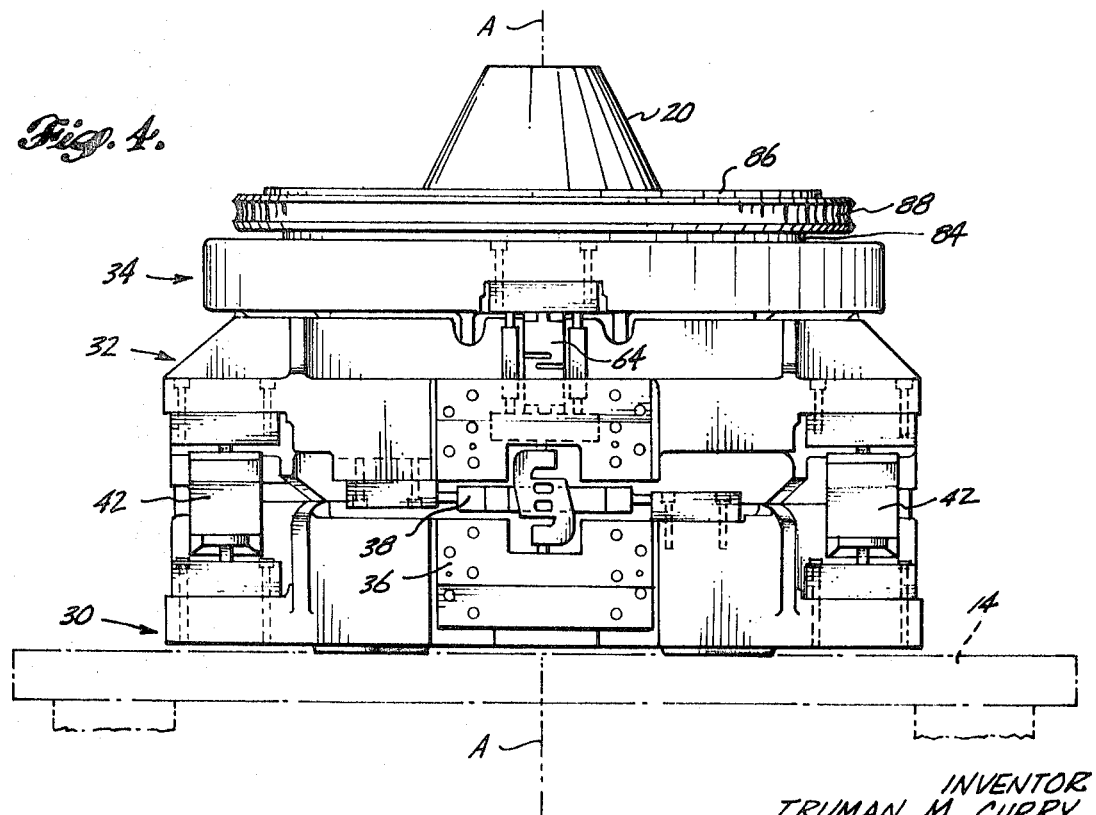
Figure 12:
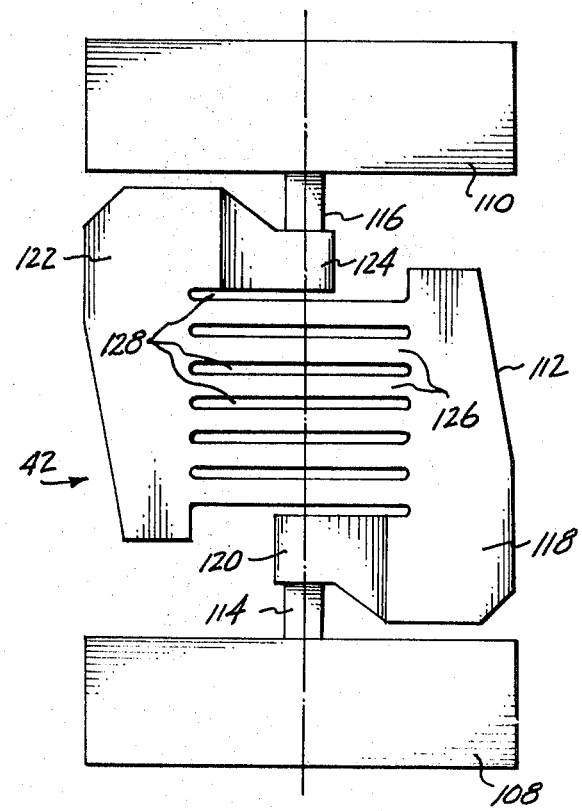
FIGS. 12 and 13 are side and front elevations, respectively, of a corner flexure, the latter figure having portions cut away and shown in section for purposes of clarity.
Figure 13:
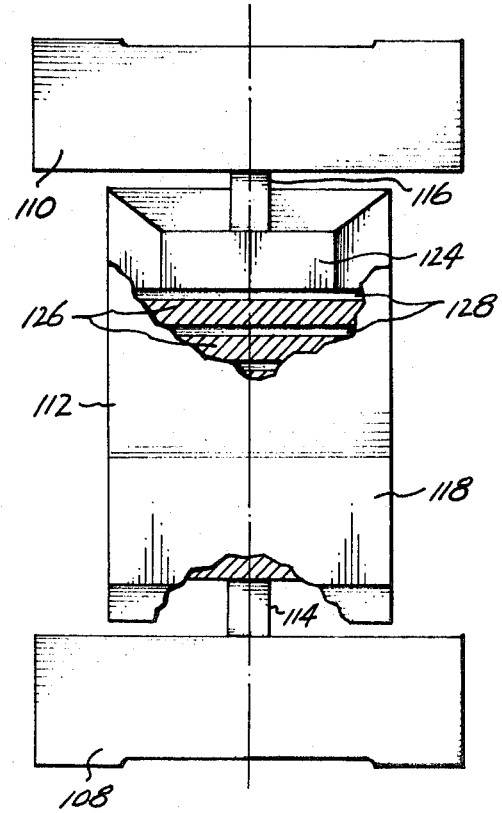

FIGS. 3 and 4 are right-side and rear views of the assembled balance, taken from machine drawings which differ in minor respects from the model from which FIGS. 1 and 2 were taken. In FIGS. 3 and 4 the wide separation and the alignment of the force and moment measuring flexure members are shown. The central axis of the lift and side force members 36 and 38 and the roll moment members 64 are aligned in the pitch plane and separated laterally from the vertical axis of the balance as far as possible to achieve the greatest stability and sensitivity, as well as to permit maximum internal space for air ducting. The drag force members 40 and the pitch moment members 66 are aligned in the roll plane and separated as far as possible laterally from the vertical center axis A of the balance. The corner flexure members 42 are positioned at the extreme corners of the balance for reasons which will be discussed.

FIGS. 3 and 4 also illustrate the heavy, rigid construction of the balance. Each of the plate structures 30, 32 and 34 is constructed to minimize internal distortions, deflections and imbalances which would cause inaccurate readings from the strain gauges mounted on respective force and moment measuring flexure members which interconnect the structures. The base or bottom plate structure 30 is suitably anchored to the supporting plate 14 at the test facility, but may be provided with suitable anchor brackets (not shown) for lifting and moving the entire balance to another location where calibration can be performed to avoid tieing up the test facility during such procedure. Each may be provided with suitable lift brackets in order to facilitate assembly and maintenance thereof.

A typical balance constructed according to the invention is forty-two inches in width and twenty-four inches high, with a model supporting strut sixty inches high. It is designed to measure the following loads:

Lift force—6,000 lbs.
Drag force—1,000 lbs.
Side force—2,000 lbs.
Rolling moment—25,000 in.-lbs.
Pitching moment—100,000 in.-lbs.
Yawing moment—25,000 in.-lbs.

Another embodiment is considerably larger and includes additional structural features which are discussed hereinafter.

The various functions of the force-measuring and moment-measuring members will be explained with the aid of the free-body and force diagrams in FIGS. 5-11. In these figures the front of the balance faces toward the lower left-hand corner of each figure, so that the front and right side of the balance is seen, as opposed to the front and left side as in the views of FIGS. 1 and 2. In the generalized description in connection with these figures, low numbers are used to designate the different load measuring members in order to facilitate their use as subscripts to designate the various reactions involved in discussing their relationships.

FIG. 5 is a mechanical schematic of the system showing the general arrangement of the load measuring flexure members. This figure, as well as FIGS. 6 to 11, are so-called "cabinet" views in which perspective is obtained by angled lines from an elevational view at the front.

The lower, intermediate and upper plates 102, 104 and 106 correspond to the lower, intermediate and upper plate structures 30, 32 and 34 in FIGS. 1 to 4. Intermediate flexures 1 and 2 which measure pitch moment $m$ and yaw moment $n$, and by measuring flexures 3 and 4 which measure roll moment $r$. The individual member axes of these pairs of flexures lie in common axial planes and converge to intersect the vertical central axis A at reference center C at which a model (not shown) is mounted and at which loads are applied as vectorially represented in FIG. 5.

Lift force L acts vertically along the central axis A, while yaw moment $n$ is represented in a positive direction clockwise about the central axis. Drag force D acts along the fore and aft axis of the model (positive in the aft direction), and roll moment $r$ acts around this axis, represented as positive in the counterclockwise direction. Side force S acts along the transverse axis through the reference center C and is taken as positive in a direction from right to left, while pitch moment $m$ is taken as positive around this axis in a clockwise direction.

Members 1, 2, 3 and 4 form a concurrent system which converts forces acting at the reference center into loads acting along the respective axes of the individual members. Moments acting at the center also produce axial loads in the members, but in addition produce translational reactions which are utilized in accordance with the invention to measure the moments themselves. Right and left pitch moment flexures 1 and 2 separated laterally in the roll moment plane are analogous to the spokes of a wheel, the center of which is the moment reference center C. Similarly, fore and aft roll moment flexures 3 and 4, respectivly, are separated in the pitch plane and aligned with the reference center like the spokes of a wheel.

Lower and intermediate plates 102 and 104 are interconnected by fore and aft lift flexures 5 and 6, respectively, separated and aligned in the pitch plane, and by right and left drag force flexures 7 and 8. These members lie widely spaced in a horizontal plane midway between plates 102 and 104 and are connected thereto by suitable mounting projections as shown. Plates 102 and 104 are further interconnected by force and aft side force flexure 9 and 10, respectively, which lie in the same horizontal plane as the drag force flexures, and are in the pitch plane, also connected to the plates by suitable mountings.

The corner flexures 11, 12, 13 and 14 also interconnect plates 102 and 104. Their function is to stabilize the system by carry bending moments between the plates, thereby facilitating the functioning of other members in the system.

FIGS. 6, 7 and 8 are free-body diagrams of the upper portion of the balance separated from the lower portion at the midpoint of the moment flexures 1, 2, 3, and 4, the lower portion 105 of the balance being shown without detail in dotted lines. Each moment flexure forms an angle $\alpha$ with the axis A at the reference center C. The internal reactions in the moment measuring members are shown due to pitching moment $m$ and drag force D in FIG. 6, due to side force S and roll moment $r$ in FIG. 7 and due to lift force L and yaw moment $n$ in FIG. 8. H is the distance between moment reference center C and the plane at which the free-body reactions are taken at the midpoint of the moment-measuring flexures FIGS. 9, 10 and 11 are free body diagrams of that portion consisting of plates 104 and 106 and the flexures connected thereto, separated from the lower portion 102 of the balance along a horizontal plane at the midpoint of the force measuring flexures between plates 102 and 104. H' is the distance between this plane and reference center C.

In FIGS, 9, 10 and 11 the internal reactions in the force measuring and corner flexures are given due to lift force L and pitching moment $m$ in FIG. 9, due to side force S and roll moment $r$ in FIG. 10, and due to yaw moment $n$ and drag force D in FIG. 11. The distance $X_1$ is the distance between the fore and after corner flexures 11, 12 and 13, 14; $X_2$ is the distance between lift force flexures 5 and 6; $X_3$ (FIG. 11) is the distance between side force flexures 9 and 10; and $Y_1$ is the distance between drag force flexures 7 and 8.

In order to analyze and discuss the various reactions in the force and moment measuring flexure members illustrated diagrammatically in FIGS. 5–9, it will be advantageous first to discuss particular configurations of the members and the manner in which they operate to achieve optimum separation of forces and moments. Following the discussion of the flexure members depicted in FIGS. 12–26, the discussion will return to analysis of the various reactions illustrated in FIGS. 5 to 9.

Each of the four identical corner flexure members 42 (FIGS. 12 and 13) consists of lower and upper mounting blocks 108 and 110 interconnected by a center flexure portion 112. The flexure portion 112 comprises axially stiff lower and upper moment relief end posts 114 and 116; lower side block 118 having a tapered projection 124 connected to end post 116; and a plurality of axially limber and transversely stiff flexures 126 interconnecting the side blocks 118 and 122 and separated from each other and from the projections 120 and 124 by milling slots 128.

The main function of the corner flexures is to carry bending reactions between the lower and intermediate plate structures 30 and 32 (FIG. 2), especially those due to roll moment and side force, and share with the lift flexures those bending moments in the pitch plane. They represent a structural compromise in that they are made limber to lift force by horizontal flexures 126. In the previously mentioned actual embodiment of the balance, with 5,000 pounds of side force on the model, the corner flexures undergo 5 minutes of deflection.

The corner flexures are limber to shear reactions between the lower and intermediate plate structures due to side force and drag force and due to yaw moment, because of the relatively limber configuration of the relief flexure end posts 114 and 116.

Hence the configuration of the corner flexures complements the configurations of other flexure members by not carrying and hence passing on for support and sensing by other members, those forces which such other members are designed to support and measure.

Each pitch and yaw moment measuring member 66 (FIGS. 14 to 16) consists of lower and upper mounting blocks 130 and 132 interconnected by a center section including a measuring beam 134 and side stabilizing columns 136 spaced on opposite sides of the measuring beam. The latter, which is designed for double cantilever bending, includes end portions 138 of I-beam cross section as shown in FIG. 16, and a transverse axial load relief flexure 140 formed by transverse milling slots 142. Thus beam 134 is limber to axial forces and stiff to translational forces perpendicular to the axial plane in which they are mounted in the balance. Stabilizer beams 136 are limber to translational forces caused by drag and side force, pitch, roll and yaw moments, because of the reduced size, of the end portions 144 thereof, but act as columns, stiff to axial forces thereon caused by roll moment or side force.

Space for mounting of strain gauges on the edges of each I-beam section 138 of center beam 134 is provided by axial milling slots 136 through the end blocks 130 and 132. These slots permit mounting of the strain gauges on the I-beams substantially in the plane of the upper surface of lower mounting block 130 and the lower surface of upper mounting block 132, these being the optimum locations for measurement. The I-beam construction of end portions 138 enables center beams 134 to carry and measure translational loads caused by pitching moment acting at the moment reference center of the model and causing double cantilever bending stresses in the beam.

Pitch moment causes a translational (shear) reaction fore and aft in the pitch measuring center beam 134, and it is this translational effect which is measured by the strain gauges mounted on sections 138. Roll moment and side force cause axial reaction in the center beam 134, and such reactions are not sensed to any significant degree because of the relative limberness of the center flexure 140. Reactions due to drag force on the model are carried primarily by roll flexures 64 (FIG. 2), and cause negligible reactions in the pitch measuring beam 134 as compared with the effect therein caused by pitch moment.

The fore and aft roll moment flexures 46 (FIG. 2) are illustrated in greater detail in FIGS. 17–19. Each consists of a configuration very similar to the pitch and yaw moment members. Lower and upper mounting blocks 148 and 150 are interconnected by a center measuring section consisting of the roll moment measuring center beam 152 and side stabilizing beams 154. Center beam 152 includes an axial relief flexure 156 located at the center point of zero bending moment and formed by transverse milling slots 158, and end sections 160 of cruciform cross section as shown in FIG. 19. Thinner web portions 164 extend in the direction of greatest stiffness of center beam 152, from the thicker center portion 166 thereof. The web portions accommodate strain gauges which measure roll moment as discussed hereinafter.

Center beam 152 is limber to reactions acting axially thereof, such as those caused by pitch moment and drag and lift force, because of the limberness of the transverse axial relief center flexure 156 as compared with the stiffness of side beams 154. However, it is stiff with respect to and hence carries translational reactions due to roll and yaw moments.

Side stabilizer beams 154 are stiff with respect to axial reactions, namely those due to pitch moment and drag and lift force. Because of their end portions 162, however, they are limber to translational forces (shear) due to roll or yaw moments or to side force acting on the model, although these members carry a negligible amount of side force as compared with that carried by the pitch moment members 66.

Lift force is measured by the lift flexure members 36 (FIGS. 1–4), illustrated in detail in FIGS. 21 to 23. Each lift force measuring member consists of lower and upper mounting blocks 168 and 170, portions of which are shown in FIG. 21, interconnected by a center measuring section 172. The latter has an S configuration with transverse load relief end posts 174 connecting lower and upper side blocks 176 and 178, respectively, to the lower and upper mounting blocks. The side blocks are interconnected by a centered transverse lift measuring beam 180 and thinner horizontal stabilizer webs 182. Spacer slots 184 are cut into the side blocks 176 and 178 within the milled cavities 186 and adjacent to measuring beam 180 to permit positioning of the strain gauges thereon near the ends thereof at points of maximum double cantilever bending stress, as illustrated in FIG. 23.

Lift measuring beam 180 is relatively stiff with respect to lift force as compared with the stabilizing webs 182. While the end posts 174 are stiff to axial forces including lift, and hence permit measurement thereof by the lift flexure 180, they are limber with respect to translational forces such as side and drag force and those shear forces between plate structures 30 and 32 caused by moments acting on the model.

Figure 24:
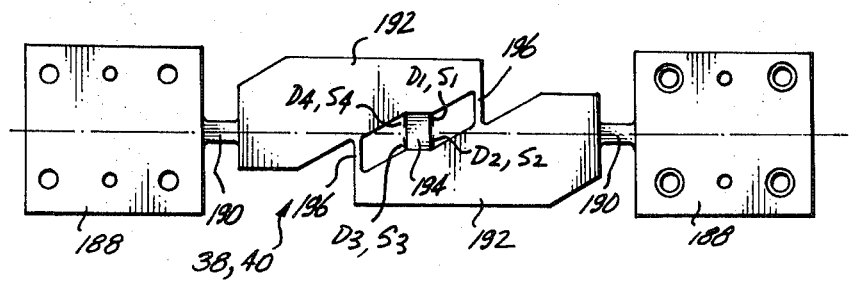
FIGS. 24 and 25 are plan and elevational views of a drag or side force measuring member of the balance, the latter figure having a portion thereof cut away to illustrate an internal detail.
Figure 25:
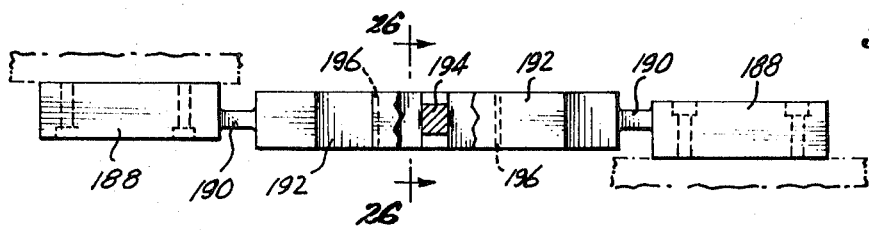
Figure 26:
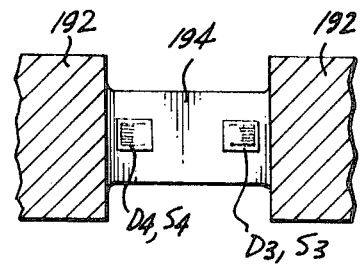
FIG. 26 is a sectional view thereof taken on line 26—26 of FIG. 25.

In accordance with the embodiment of the invention illustrated in FIGS. 1 to 4, the drag and side force members 38 and 40, respectively, are similar and one such member is illustrated in detail in FIGS. 24 to 26. Each such member includes end mounting blocks 188 interconnected by a center section consisting of transverse load relief end posts 190, and longitudinally overlapping blocks 192 interconnected by a center force measuring flexure 194 and stabilizing webs 196. Strain gauges are mounted on the center flexure 194 as illustrated in FIG. 26 and are discussed hereinafter.

In the case of side force members 38, end posts 190 are limber to the translational forces caused by lift and drag force and pitch moment acting on the model. These portions are also limber to any bending moments not absorbed by the corner flexures 42. However, side force causing axial force within the member is measured by the center flexure 194, since end posts 190 are stiff to transmit such force thereto. Stabilizing webs 196 protect the center flexure 194 from any bending stresses within the beam, thereby assuring only double cantilever bending stress therein. The same principles apply in the case of the drag force members 40.

Returning to a discussion of the relationships of the reactions, as illustrated in the diagrams of FIGS. 5 to 9, it will be helpful to keep in mind the structures just described. In FIG. 6 equal translational reactions $P_{1m}$ and $P_{2m}$ in pitch measuring flexures 1 and 2 are caused by the clockwise pitch moment $m$ applied at reference center C. These reactions cause a double cantilever bending moment distribution in the pitch measuring flexures 1 and 2.

Figure 14:
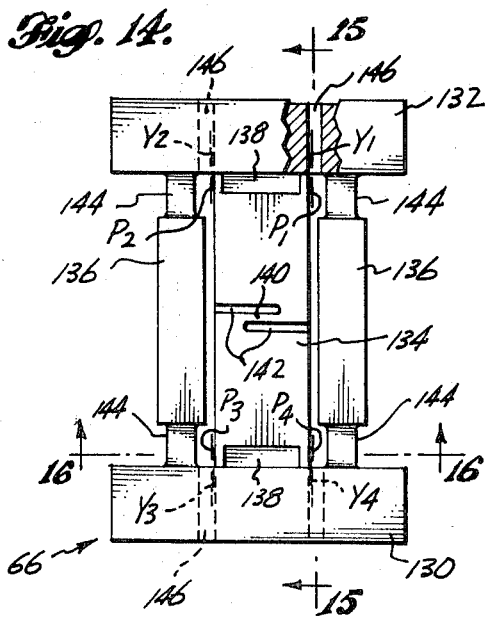
FIG. 14 is a side elevation of a pitch moment measuring member.

Referring to FIG. 14, such double cantilever bending is carried by the center beam 134 and is a maximum in each end section 138 where the strain gauges are located. Because the stiffness of beam 134 to such translational forces is much greater than that of the side stabilizing beams 136 as previously noted, the percentage of load absorbed by the side beams may be considered negligible.

Because of their orientation and configuration (see FIGS. 17 and 18) roll flexures 3 and 4 (FIG. 6) are much more flexible in the transverse (P) direction (of drag) and thus absorb relatively small amounts of pitch reactions $P_{3m}$ and $P_{4m}$ acting perpendicular to the respective axes of these members. Thus most of the load in the P (drag) direction is carried by pitch flexures 1 and 2.

$R_{3m}$ and $R_{4m}$ are the axial reactions in flexures 3 and 4 caused by pitching moment, and $R_{3D}$ and $R_{4D}$ are the axial reactions therein caused by drag force. These reactions are carried by the side stabilizer struts 154 in the roll moment members 64 (FIG. 17), since these members are much stiffer in the axial force direction than is the double cantilever center beam 134.

Figure 15:
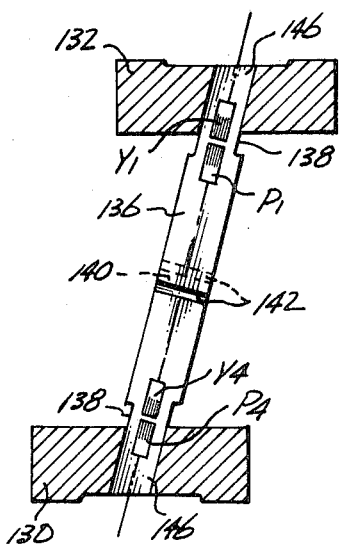
FIG. 15 is a sectional side view thereof taken on line 15—15 of FIG. 14.
Figure 16:
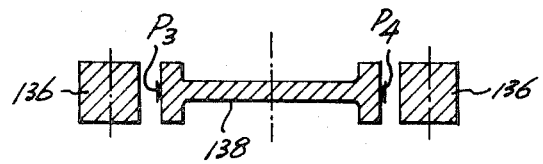
FIG. 16 is a sectional view taken on line 16—16 of FIG. 14.
Figure 16A:
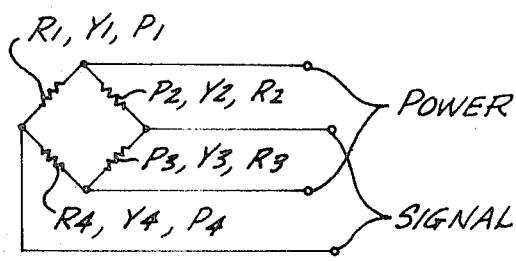
FIG. 16a is a circuit diagram showing typical strain gauge bridge circuit wiring.

Translational forces $P_{1m}$ and $P_{2m}$ are sensed by strain gauges $P_1$, $P_2$, $P_3$ and $P_4$ mounted on the edges of the I-beam sections 138 of the pitch measuring beam 134 (FIGS. 14 to 16). The wiring of these strain gauges in bridge circuits in a known manner is illustrated in FIG. 16a. The two corresponding bridges for both pitch moment members 66 are connected in parallel to add (not shown) so that signals caused by reactions $P_{1m}$ and $P_{2m}$, being of the same sign reinforce each other.

Referring to FIG. 8, equal and opposite reactions $P_{1n}$ and $P_{2n}$ in flexures 1 and 2 are caused by yaw moment $n$ acting in the clockwise direction about the balance axis A. In FIGS. 14 and 15, yaw moment strain gauges $Y_1$, $Y_2$, $Y_3$ and $Y_4$ are shown mounted on the edges of the I-beam end sections 138 of the pitch measuring beam 134. These strain gauges are also wired in bridge circuits, as illustrated in FIG. 16a. Since the yaw moment reactions $P_{1n}$ and $P_{2n}$ are equal and opposite in sign, they cancel when the bridges for pitch members 66 are wired in parallel to add. Since the yaw moment bridges are wired electrically in parallel to subtract, and the yaw moment reactions $P_{1n}$ and $P_{2n}$ are of opposite sign, they reinforce each other while those signals caused by pitch moment reactions $P_{1m}$ and $P_{2m}$, being of the same sign, cancel. Thus a first pair of circuits are wired to measure pitch moment while cancelling the effect of yaw moment, and a second pair are wired to cancel the effect of pitch moment and measure yaw moment.

Referring to FIGS. 7 and 8, equal transverse reactions $Q_{3r}$ and $Q_{4r}$ caused in flexures 3 and 4 by roll moment $r$ are equal and of the same sign. Reactions $R_{1r}$, $R_{1S}$, $R_{2r}$ and $R_{2S}$ are the axial reactions in flexures 1 and 2, respectively, caused by roll moment $r$ and side force S acting at the reference center C.

The relationships among $Q_{3r}$, $Q_{4r}$, $R_{1r}$, $R_{1S}$, $R_{2r}$ and $R_{2S}$ with respect to roll moment $r$ and side force S are completely analogous to the relationships among $P_{1m}$, $P_{2m}$, $R_{3m}$, $R_{3D}$, $R_{4m}$, and $R_{4D}$ in respect to pitch moment $m$ and drag force D (FIGS. 6 to 8), as discussed above. It is therefore not necessary to discuss these relationships further herein and would only unduly lengthen the description. Yaw moment strain gauges are not shown on the roll moment flexures 64 as they are on the pitch moment flexure 66. However, the locations and wiring of roll moment strain gauges are shown in FIGS. 17 to 20 and 16a.

FIGS. 9 and 11 show reactions $R_{5L}$ and $R_{6L}$ in the lift flexures 5 and 6 caused by application of lift force L. These reactions are equal and of the same sign. Also shown are reactions $R_{5m}$ and $R_{6m}$ in flexures 5 and 6 caused by pitch moment $m$. These are equal and of opposite sign. In addition, drag force reactions $R_{5D}$ and $R_{6D}$ in lift flexures 5 and 6 (FIG. 11) are equal and of opposite sign.

Strain gauges mounted on the center flexure 180 of the lift force member 36 (FIGS. 21 to 23) are wired in bridge circuits which are in turn wired in parallel electrically to add their output signals. The output signals due to lift force L are the same sign and reinforce each other, while signals caused by pitch moment $m$ and drag force D, being of opposite sign cancel.

FIG. 10 shows side force reactions $R_{9S}$ and $R_{10S}$ in side force flexures 9 and 10 due to side force S; reactions $R_{11S}$, $R_{12S}$, $R_{13S}$ and $R_{14S}$ in corner flexures 11, 12, 13 and 14 due to side force S; and reactions $R_{11r}$, $R_{12r}$, $R_{13r}$ and $R_{14r}$ in the respective corner flexures due to roll moment $r$.

FIG. 11 shows drag force reactions $R_{7D}$ and $R_{8D}$ in drag flexures 7 and 8; drag force reactions $R_{11D}$, $R_{12D}$, $R_{13D}$ and $R_{14D}$ in corner flexures 11, 12, 13 and 14; yaw moment reactions $R_{7n}$ and $R_{8n}$ in drag flexures 7 and 8; and yaw moment reactions $R_{9n}$ and $R_{10n}$ in side force flexures 9 and 10.

Drag force reactions $R_{7D}$ and $R_{8D}$ in flexures 7 and 8 are of the same sign, while yaw moment reactions $R_{7n}$ and $R_{8n}$ are of opposite sign. Likewise side force reactions $R_{9S}$ and $R_{10S}$ in flexures 9 and 10 are of the same sign, while reactions $R_{9n}$ and $R_{10n}$ are of opposite sign.

Figure 26A:
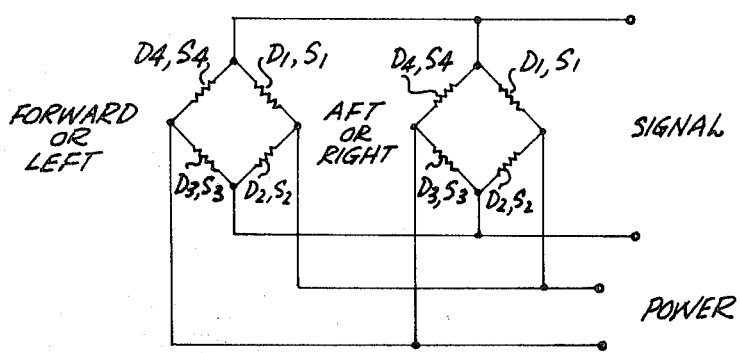
FIG. 26a is a circuit diagram of typical strain gauge circuit wiring.
Figures 28, 29:
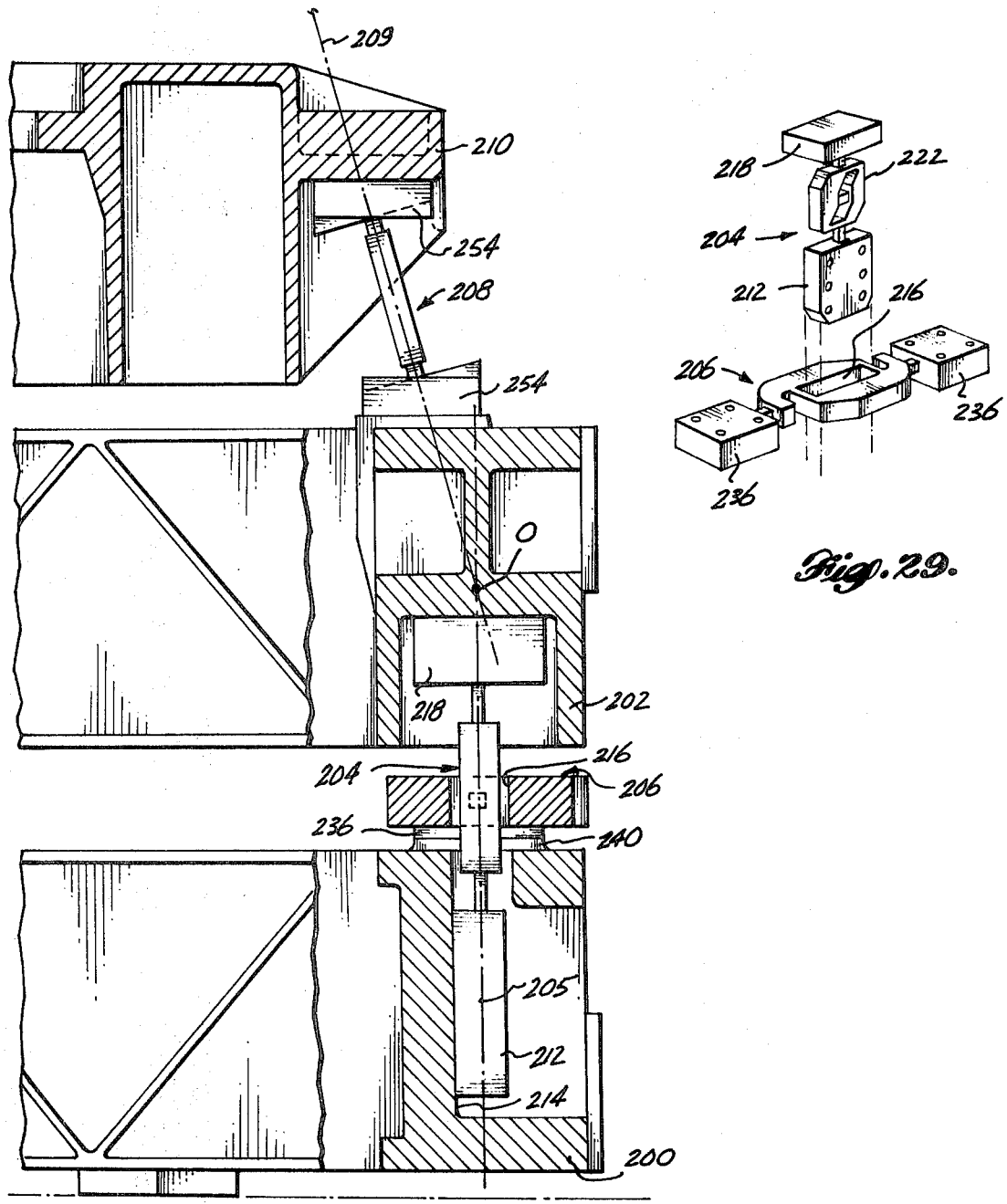
FIG. 28 is a sectional, elevational view of a portion of the structure shown in FIG. 27.
FIG. 29 is an isometric exploded view on a reduced scale, showing the interfitting relationship of the lift force and side force members of the embodiment of FIGS. 27 and 28.
Figure 30:
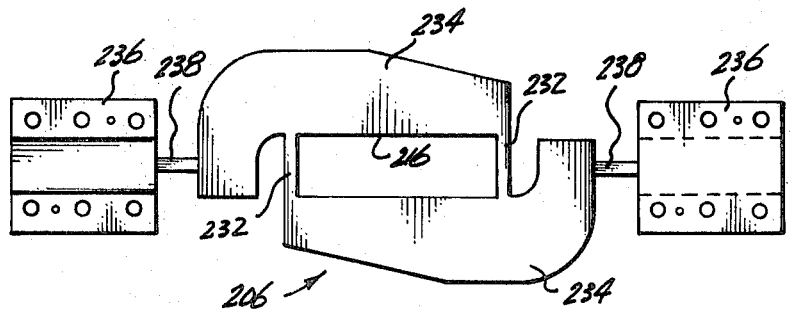
FIGS. 30, 31, 32 and 33 are illustrative views of the side force, drag force, lift force, and roll moment measuring members, respectively, of the embodiment illustrated in FIGS. 27 and 28.

Strain gauges $D_1$, $D_2$, $D_3$ and $D_4$ (FIG. 24) are mounted on the drag force measuring beam 144 and wired in the manner shown in FIG. 26a to measure drag force D. Similarly, strain gauges $S_1$, $S_2$, $S_3$ and $S_4$ are mounted in the same manner and wired in the same way as shown to measure side force S. The signals due to drag force D and side force S, being of the same sign, reinforce each other while any signal components due to yaw moment $n$ in the drag and side force circuits cancel each other and hence are not measured.

In FIG. 10 it is seen that corner flexures 11, 12, 13 and 14 carry the reactions caused by overturning (bending) moments between plates 102 and 104 due to the application of side force S and roll moment $r$. These applied loads do not influence the drag and side force measuring elements.

These same principles and arrangements of flexures and stabilizing beams, such as the corner flexures, are applied in a second embodiment of the invention illustrated in FIGS. 27 to 33. In one application of the invention an extra large external balance was required, measuring approximately 10 feet across. However, the same relative rigidity in the plate structure was required to avoid distortions from applied loads, yet lightweight construction was also required in order to allow some portability of the structure. Hence the large balance was constructed of aluminum, but special modifications in the configuration were made in order to avoid distortions in the plate structures.

In particular, FIG. 27 is an isometric, partially sectioned view of that portion of the large scale external balance according to this embodiment of the invention, showing lift and side force measuring members and a roll moment measuring member.

The lower plate structure of cast aluminum I-beam configuration includes a side beam 200. This casting is interconnected with the side beam 202 of an intermediate casting, by the lift force measuring member 204 and side force measuring member 206. The intermediate beam 202 in turn is connected to an upper plate structure 210 (FIG. 28) by the roll moment measuring member 208. Beam structures 200, 202, and 210 correspond to plate structures 30, 32 and 34 in FIGS. 1 and 2, while lift force member 204, side force member 206, and the roll moment member 208 correspond respectively to lift flexure member 36, side force member 38, and roll moment member 64 of the previous embodiment.

In order to avoid bending stresses in the beam structures 200, 202 and 210, according to this embodiment individual member axes of the force and moment measuring members intersect the elastic axes of the side beam segments of the castings. Hence the elastic axis 201 of beam structure 200 is aligned in the same plane as the elastic axis 203 of beam structure 202, and the vertical axis 205 of lift flexure member 204 intersects both. Further, the axis of side force member 206 is in the vertical plane defined by elastic axes 201 and 203 of beam structures 200 and 202 and has its vertical center axis coincident with that of the lift flexure 204.

The coincidence of the lift and side force member axes is achieved by interleaving these two members so that the lift force member 204 passes through the center of side force member 206. This is shown in the disassembled view of FIG. 29, as well as in the isometric and sectional views of FIGS. 27 and 28, respectively.

In addition, the longitudinal axis 209 of roll moment member 208 intersects both the axis 203 of beam structure 202 and vertical axis 205 of lift flexure 204 at point O. Lift force member 204 includes lower mounting block 212 adapted to be bolted onto the vertical mounting face 214 of beam structure 200, and its configuration is such that it can be passed through the center cavity 216 in the side force flexure 206 for purposes of assembly. The upper mounting block 218 of the lift force member is adapted to be bolted to the mounting face 220 of intermediate beam structure 202 and is connected to the lower mounting block 212 by the lift force measuring section 222. The measuring section 222 is of somewhat different configuration than the measuring section of lift force member 36 in the embodiment first described. However, the principle of operation is the same. The traverse load relief end posts 224 transmit lift force to side block sections 226 which are interconnected by a center lift force measuring beam 228 and stabilizing webs 230.

The side force member 206 omits the center measuring beam 194 (FIG. 24) of the previous embodiment, to receive the lift force member in a center cavity 216. Strain gauges (not shown) are instead mounted on the webs 232 which interconnect side blocks 234, the latter being in turn connected to mounting blocks 236 by end posts 238. The end blocks 236 have their opposite faces, respectively, mounted on suitable mounting projections 240 and 242 on the lower and intermediate beam structures 200 and 202 (FIG. 27).

Figure 31:
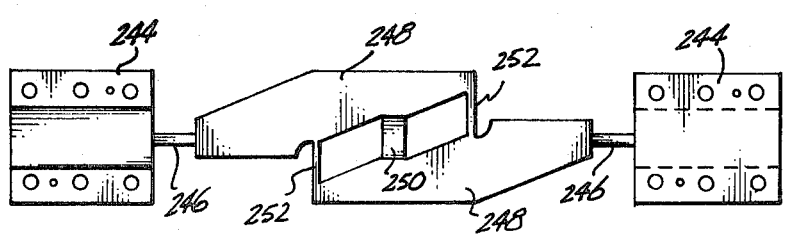
Figure 32:
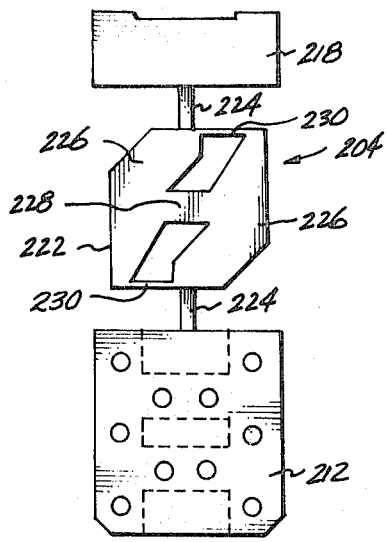
Figure 33:
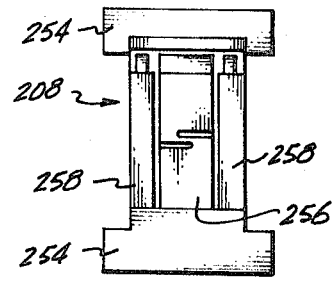

The drag force member utilized in this embodiment is shown in FIG. 31 and consists of end mounting blocks 244 interconnected by a measuring section having end posts 246 supporting longitudinally overlapping side blocks 248 which are interconnected by a center transverse measuring beam 250 and stabilizing web portions 252. This configuration is identical in principle to the side and drag force members 38 and 40 in the embodiment first described.

The roll moment measuring member 208, which is similar to the pitch moment members (not shown) of this embodiment, consists of end mounting blocks 254 interconnected by a center double cantilever beam 256 and axial force carrying side beams 258. The center beam 256 includes an axial force relief flexure 260 at its center, rendering it limber to axial forces, and further includes cruciform end sections 262 which perform the same functions as those of the roll moment member previously described (FIGS. 17 to 20). Side beams 258 include end sections 264 of reduced size rendering these members limber to translational forces.

The pitch moment members (not shown) are of similar construction, but include end sections of I-beam configurations like those of the pitch moment members in the previous embodiment (FIGS. 14 to 16).

As in the previous embodiment, this second embodiment just described achieves optimum lateral spacing of the force and moment measuring flexures for maximum separation of forces and moments and maximum space within the balance to accommodate auxiliary air ducting. The particular design of the beam structures and alignment of axes thereof with the force and moment measuring flexures in the pitch plane avoids distortional stresses in the supporting structures and permits a lightweight construction making large scale balances practical and still portable without extra reinforcement.

What is claimed is:

1. A device for measuring loads acting on a model mounted thereon at a reference center remote from the device, said device comprising
    (a) a plurality of load measuring members transversely spaced substantially symmetrically with respect to a central axis passing through the reference center, said load measuring members including
    (b) a pair of moment measuring members mounted in a common axial plane on respective convergent member axes intersecting the reference center, each member having
        (1) a measuring beam insensitive to forces along the member axis thereof and sensitive to translational forces acting thereon transverse to said common axial plane, and
        (2) stabilizing means mounted in parallel with said measuring beam for carrying said forces acting along the member axis while being limber to said translational forces,
    (c) means providing stiffness with respect to loads transverse to said common axial plane, and
    (d) means for supporting said model at said reference center and capable of transmitting loads acting thereon to said load measuring members.

2. The device of claim 1 including first and second such pairs of moment measuring members mounted, respectively in first and second mutually perpendicular axial planes, each such member being limber to force components acting thereon in the axial plane in which it is mounted and perpendicular to its member axis.

3. The device of claim 1 wherein each of said measuring beams comprises a center section stiff to translational forces perpendicular to the axial plane in which it is mounted, an axial load relief flexure extending transversely in said center section, and end sections supporting the center section and having locations thereon for strain gauges to measure said translational forces acting thereon.

4. The device of claim 3 wherein said end sections have I-beam cross sections.

5. The device of claim 3 wherein said end sections have substantially cruciform cross sections with thinner web portions thereof extending perpendicular to said axial plane.

6. The device of claim 3 wherein said stabilizing means comprise a pair of side beams located on opposite sides of said measuring beam and acting as columns to carry said axial forces, each side beam having end sections limber to said translational forces.

7. The device of claim 2 wherein each of said measuring beams comprises a center section stiff to translational forces perpendicular to the axial plane in which it is mounted, an axial load relief flexure extending transversely in said center section, and end sections supporting the center section and having locations thereon for strain gauges to measure said translational forces acting thereon.

8. The device of claim 7 wherein the measuring beam end sections of the moment measuring members mounted in said first plane have cruciform cross sections with thinner web portions extending perpendicular to said first axial plane and the measuring beam end sections of the moment measuring members mounted in the second axial plane have I-beam cross sections with their web portions extending perpendicular to the second axial plane.

9. The device of claim 8 wherein said stabilizing means comprise a pair of side beams located on opposite sides of said measuring beam and acting as columns to carry said axial forces, each side beam having end sections limber to said translational forces.

10. The device of claim 2 wherein said load measuring members further include
    (a) axial force measuring members mounted on member axes parallel to said central axis, and (b) transverse force measuring members each mounted on a member axis perpendicular to one of said axial planes, said device further including moment carrying members mounted in parallel with said axial load measuring members and adapted to carry moment components acting in said axial planes.

11. The device of claim 10 wherein said moment carrying members include transverse flexures rendering them limber relative to said axial force measuring members in response to axial force.

12. The device of claim 10 wherein said axial and transverse force measuring members include a pair of members for measuring forces acting along their member axes, each member having end sections including moment relief flexures which are stiff to axial forces thereon and a center section comprising longitudinally overlapping body portions supported by the respective end sections and interconnected by a stiff central transverse measuring beam sensitive to axial forces and by first and second axially limber transverse stabilizing beams on opposite sides of the transverse measuring beam axially of the member.

13. The device of claim 10 including first and second support structures interconnected by said axial and transverse force measuring members, and wherein said moment measuring members interconnect said second support structure and said model supporting means.

14. The device of claim 13 wherein said transverse force measuring members are mounted having their member axes lying substantially in a common transverse plane between said first and second support structures and are spaced substantially equidistant from said central axis at locations adjacent to the periphery of said supporting structures.

15. The device of claim 13 wherein said supporting structures include means defining a central cavity in said device and said model supporting means includes a passageway communicating with said cavity.

16. The device of claim 10 wherein a pair of said transverse force measuring members each includes means defining an opening therein for receiving one of said axial load measuring members whereby their respective member axes intersect.

17. The device of claim 16 including first and second support structures interconnected by said axial and transverse load measuring members, said structures having respective side beams whose elastic axes extend in parallel in the plane defined by the intersecting axes of said axial and transverse force measuring members.

18. The device defined in claim 17 wherein said moment measuring members are mounted on respective side beams of said second support structure with their respective member axes intersecting the elastic axes of said second support structure side beams, said model supporting means being connected to said second support structure by said moment measuring members.

19. The device of claim 10 including means mounting the axial and transverse force measuring members whereby their respective member axes intersect.

20. The device of claim 19 including first and second support structures interconnected by said axial and transverse load measuring members, said structures having respective side beams whose elastic axes extend in parallel in the plane defined by the intersecting axes of said axial and transverse force measuring members.

21. The device of claim 10 including first and second support structures interconnected by said axial and transverse force measuring members, said structures having respective side beams whose elastic axes lie in planes parallel to said central axis, and means mounting said transverse force measuring members with their respective member axes in said parallel planes.

22. The device of claim 21 wherein said moment measuring members are mounted on respective side beams of said second support structure with their member axes intersecting the elastic axes of the respectives second support structure side beams.

23. The device of claim 22 including means mounting the respective axial force measuring members with their member axes lying in said parallel planes, respectively.

24. The device of claim 2 wherein said load measuring members further include
(a) a first pair of force measuring members mounted in the first axial plane on respective member axes parallel to said central axis, for measuring forces acting on said model in the direction of said central axis;
(b) a second pair of force measuring members mounted at locations in said first axial plane on member axes parallel to said second axial plane and perpendicular to the first, for measuring forces acting on said model in the direction of their member axes; and
(c) a third pair of force measuring members mounted at locations in said second axial plane on member axes parallel to said first axial plane and perpendicular to the second, for measuring forces acting on said model in the direction of their member axes.

25. A large scale external balance for measuring loads acting on a model mounted at a reference center remote from said device, comprising
(a) a plurality of force and moment measuring members spaced substantially symmetrically with respect to a central axis passing through said reference center; and
(b) support means including
(1) a base,
(2) a transverse plate structure interconnecting said measuring members, and
(3) model supporting means physically coupled to said transverse plate structure;
(c) said plate structure and said model supporting means including means defining a passageway substantially centrally of said device providing communication through said device between said model and the region of said base.

26. The balance defined in claim 25 wherein said model supporting means includes a second transverse plate structure coupled to the first plate structure by said measuring members and having means defining a central passageway therein, an annular turntable assembly mounted on said second plate structure for rotation about said central axis, and turntable drive means connected between said turntable and said second plate structure.

27. The balance defined in claim 26 including
(a) an annular sealing plate mounted on said second plate structure and having means thereon for attaching a fluid supply line,
(b) fluid carrying means mounted on said turntable, and
(c) means for transmitting fluid from said supply line through said passageways and through said sealing plate, including fluid seal means between the sealing plate and turntable and permitting rotation therebetween.

References Cited

UNITED STATES PATENTS

| | | | |
|---|---|---|---|
| 2,768,526 | 10/1956 | Trimble et al. | 73—147 |
| 2,910,866 | 11/1959 | Czerwinski | 73—147 |
| 3,159,027 | 12/1964 | Curry | 73—147 |
| 3,241,360 | 3/1966 | Curry | 73—147 |
| 3,412,604 | 11/1968 | Iandolo | 73—147 |

FOREIGN PATENTS

| | | | |
|---|---|---|---|
| 1,912,574 | 3/1969 | Germany | 73—147 |

S. CLEMENT SWISHER, Primary Examiner